US012766888B2

(12) United States Patent
Dastan

(10) Patent No.: US 12,766,888 B2
(45) Date of Patent: Oct. 20, 2026

(54) DECOUPLING GROOVE FOR TIRE

(71) Applicant: THE GOODYEAR TIRE & RUBBER COMPANY, Akron, OH (US)

(72) Inventor: Mustafa Dastan, Findlay, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 17/745,368

(22) Filed: May 16, 2022

(65) Prior Publication Data

US 2022/0396102 A1 Dec. 15, 2022

Related U.S. Application Data

(60) Provisional application No. 63/210,547, filed on Jun. 15, 2021.

(51) Int. Cl.
*B60C 11/13* (2006.01)
*B60C 11/03* (2006.01)

(52) U.S. Cl.
CPC ... *B60C 11/1323* (2013.01); *B60C 2011/0353* (2013.01); *B60C 2011/0355* (2013.01); *B60C 2200/06* (2013.01)

(58) Field of Classification Search
CPC ....... B60C 2011/039; B60C 2011/0397; B60C 11/01
See application file for complete search history.

(56) References Cited

U.S. PATENT DOCUMENTS

| | | | |
|---|---|---|---|
| 3,400,745 | A | 9/1968 | Schwartz |
| 4,262,722 | A | 4/1981 | Takigawa et al. |
| 4,373,566 | A | 2/1983 | Hirakawa et al. |
| 4,480,671 | A | 11/1984 | Giron |
| 4,836,256 | A | 6/1989 | Meliconi |
| 4,836,257 | A | 6/1989 | Mamada et al. |
| 5,522,442 | A | 6/1996 | Kishi |
| 5,660,652 | A | 8/1997 | Young et al. |

(Continued)

FOREIGN PATENT DOCUMENTS

| | | | |
|---|---|---|---|
| CN | 1891501 | A | 1/2007 |
| DE | 2436115 | A1 | 2/1976 |

(Continued)

OTHER PUBLICATIONS

JP-2002079809 Machine Translation (Year: 2002).*

(Continued)

*Primary Examiner* — Katelyn W Smith
*Assistant Examiner* — Wendy L Boss
(74) *Attorney, Agent, or Firm* — Eryn Fuhrer; June E. Rickey

(57) ABSTRACT

A tire includes a circumferentially continuous decoupling groove that extends radially inward toward the rotational axis of the tire. The decoupling groove is formed by inner and outer walls that are axially spaced apart from each other and joined by a base wall interconnecting inner radial portions thereof. A width between the inner and outer walls of the decoupling groove varies over a radial depth of the decoupling groove. The inner wall extends at an angle of approximately 5° from a radial plane disposed perpendicular to the rotational axis of the tire.

13 Claims, 2 Drawing Sheets

(56) References Cited

U.S. PATENT DOCUMENTS

| | | | | |
|---|---|---|---|---|
| 5,921,301 | A | 7/1999 | Quiram et al. | |
| 5,921,303 | A | 7/1999 | Matsumoto | |
| 6,460,584 | B1 | 10/2002 | de Labareyre | |
| 6,550,509 | B1 | 4/2003 | Nguyen et al. | |
| 6,681,823 | B2 | 1/2004 | Nakamura | |
| 6,722,408 | B2 | 4/2004 | Naito | |
| 7,431,062 | B2 | 10/2008 | Gojo | |
| 7,992,606 | B2 | 8/2011 | Sakaguchi et al. | |
| 8,074,690 | B2 * | 12/2011 | Sevart | B60C 11/01 152/209.16 |
| 8,322,387 | B2 | 12/2012 | Chun et al. | |
| 8,381,783 | B2 | 2/2013 | Miyake | |
| 8,794,279 | B2 | 8/2014 | Andou | |
| 8,875,756 | B2 | 11/2014 | Okabe | |
| 9,272,579 | B2 | 3/2016 | Tanada | |
| 10,639,940 | B2 | 5/2020 | Miyake | |
| 2004/0112493 | A1 | 6/2004 | Warchol et al. | |
| 2005/0051250 | A1 * | 3/2005 | Gojo | B60C 11/01 152/209.16 |
| 2007/0267115 | A1 | 11/2007 | Mathews | |
| 2008/0142135 | A1 | 6/2008 | Mathews | |
| 2008/0149241 | A1 | 6/2008 | Maruyama et al. | |
| 2009/0133792 | A1 | 5/2009 | Chun et al. | |
| 2014/0326380 | A1 | 11/2014 | Kotoku | |
| 2018/0134091 | A1 | 5/2018 | Yokomakura | |
| 2018/0147890 | A1 | 5/2018 | Suita | |
| 2018/0147895 | A1 | 5/2018 | Suita | |
| 2018/0154701 | A1 | 6/2018 | Miyake | |
| 2019/0193471 | A1 | 6/2019 | Kuwano | |
| 2019/0263185 | A1 | 8/2019 | Lee et al. | |
| 2021/0039444 | A1 | 2/2021 | Taniguchi | |
| 2022/0250415 | A1 * | 8/2022 | Todoroki | B60C 11/13 |

FOREIGN PATENT DOCUMENTS

| | | | |
|---|---|---|---|
| EP | 1 024 967 | A1 | 8/2000 |
| EP | 2 127 906 | B1 | 4/2012 |
| JP | 300-7603 | A | 1/1991 |
| JP | 300-7604 | A | 1/1991 |
| JP | 2002-79809 | A | 3/2002 |
| JP | 4191512 | B2 | 9/2008 |
| JP | 4935095 | B2 | 5/2012 |
| JP | 5194365 | B2 | 2/2013 |
| JP | 2013107545 | A | 6/2013 |
| JP | 2014213835 | A | 11/2014 |
| KR | 199206915 | B1 | 8/1992 |
| KR | 1999-0014723 | U | 5/1999 |
| KR | 10-245518 | B1 | 3/2000 |
| KR | 10-2004-037633 | A | 5/2004 |
| KR | 20050035441 | A | 4/2005 |
| KR | 10-2005-0090223 | A | 9/2005 |
| KR | 10-2006-0002276 | A | 1/2006 |
| KR | 10-583647 | B1 | 5/2006 |
| KR | 10-792973 | B1 | 1/2008 |
| KR | 10-2009051510 | A | 5/2009 |
| KR | 10-2010063872 | A | 6/2010 |
| KR | 10-1053904 | B1 | 8/2011 |
| WO | WO 1998 58810 | | 12/1988 |
| WO | WO 2010/137723 | A1 | 12/2010 |
| WO | WO 2014/178186 | A1 | 11/2014 |
| WO | WO 2015/136996 | A1 | 9/2015 |
| WO | WO 2016/105409 | A1 | 6/2016 |

OTHER PUBLICATIONS

JP 2013107545 machine translation (Year: 2013).* https://www.retread.org/so/f6NGCGTV_?cid=0c6dfc46-e101-4845-9930-9c830949e290#/main, Sep. 10, 2020.

Translation of Chinese Search Report for Serial No. 202210675708.1 mailed Oct. 20, 2023.

* cited by examiner

DECOUPLING GROOVE FOR TIRE

BACKGROUND

This application claims the priority benefit of U.S. provisional application Ser. No. 63/210,547, filed Jun. 15, 2021, the entire disclosure of which is expressly incorporated herein by reference.

This invention relates to a tire, and particularly relates to what is commonly referred to as a decoupling groove on a tire, and particularly in connection with a truck and bus radial (TBR) tire.

A decoupling groove is a narrow, circumferential groove located on an outboard edge of a shoulder rib. Generally, the decoupling groove helps prevent irregular wear patterns from developing on the axially outer side of the shoulder ribs. Substantially all TBR long haul steer tires feature a decoupling groove. One problem associated with such a circumferential groove is that a bottom surface of the decoupling groove can be a point of crack initiation. This can result in potential shoulder chunking or rib tearing of the tread. Consequently, a need exists to improve crack and tear resistance over existing designs.

A need exists for an improved system that resolves at least one or more of the above-described problems, as well as still providing other features and benefits.

SUMMARY

An improved decoupling groove for a tire has been developed.

A preferred embodiment of the tire includes a first side wall and a second sidewall joined to each other and in axially spaced relation along a rotational axis of the tire by a circumferentially extending ground engaging surface. A circumferentially continuous decoupling groove extends radially inward toward the rotational axis of the tire. The decoupling groove is formed by inner and outer walls that are axially spaced apart from each other and joined by a base wall interconnecting inner radial portions thereof. A width between the inner and outer walls of the decoupling groove varies over a radial depth of the decoupling groove. The inner wall extends at an angle of approximately 5° from a radial plane disposed perpendicular to the rotational axis of the tire.

A shoulder region is located where the first sidewall transitions into the ground engaging surface. The decoupling groove is located in the shoulder region at the interface of the ground engaging surface and the shoulder and delineates a decoupling shoulder.

The decoupling shoulder has a radial height preferably less than the radial dimension of the ground engaging surface, i.e., on the order of 0.25 inches.

The decoupling shoulder preferably includes a radiused, first corner where the decoupling shoulder merges with the outer wall of the decoupling groove, and a radiused, second corner where the decoupling shoulder merges with the first sidewall of the tire.

The inner wall diverges axially from the outer wall as the inner and outer walls of the decoupling groove extend radially outward from the base wall.

The base wall is preferably located radially outward of a non-skid line of the tire (where the non-skid line is understood to be the bottom of primary tread grooves and adjacent a transition between a base compound rubber and a rubber compound disposed on top of the base compound rubber that forms the cap or tread ground engaging surface).

The decoupling groove includes an undercut region in the inner wall.

The undercut region is at least partially defined by a base wall of the decoupling groove having a greater axial dimension than a minimum axial spacing between the inner wall and the outer wall located above the undercut region.

Preferably, the decoupling shoulder has a wider axial dimension along a base portion thereof than a smaller axial dimension along an outer radial surface thereof.

Transition regions between the groove walls and the undercut region, the transitions of the inner wall in the undercut regions into the base wall, and the base wall into the outer wall of the decoupling groove are radiused corners.

A primary benefit of the new design relates to reduced failures in the decoupling rib region of the tire.

Another advantage associated with the minimized rib tearing, and likewise reduced shoulder chunking by addressing stresses imposed on the shoulder rib and decoupling rib by incorporating the decoupling groove/decoupling rib design.

Benefits and advantages of the present disclosure will become more apparent from reading and understanding the following detailed description.

DETAILED DESCRIPTION

Figure 1:
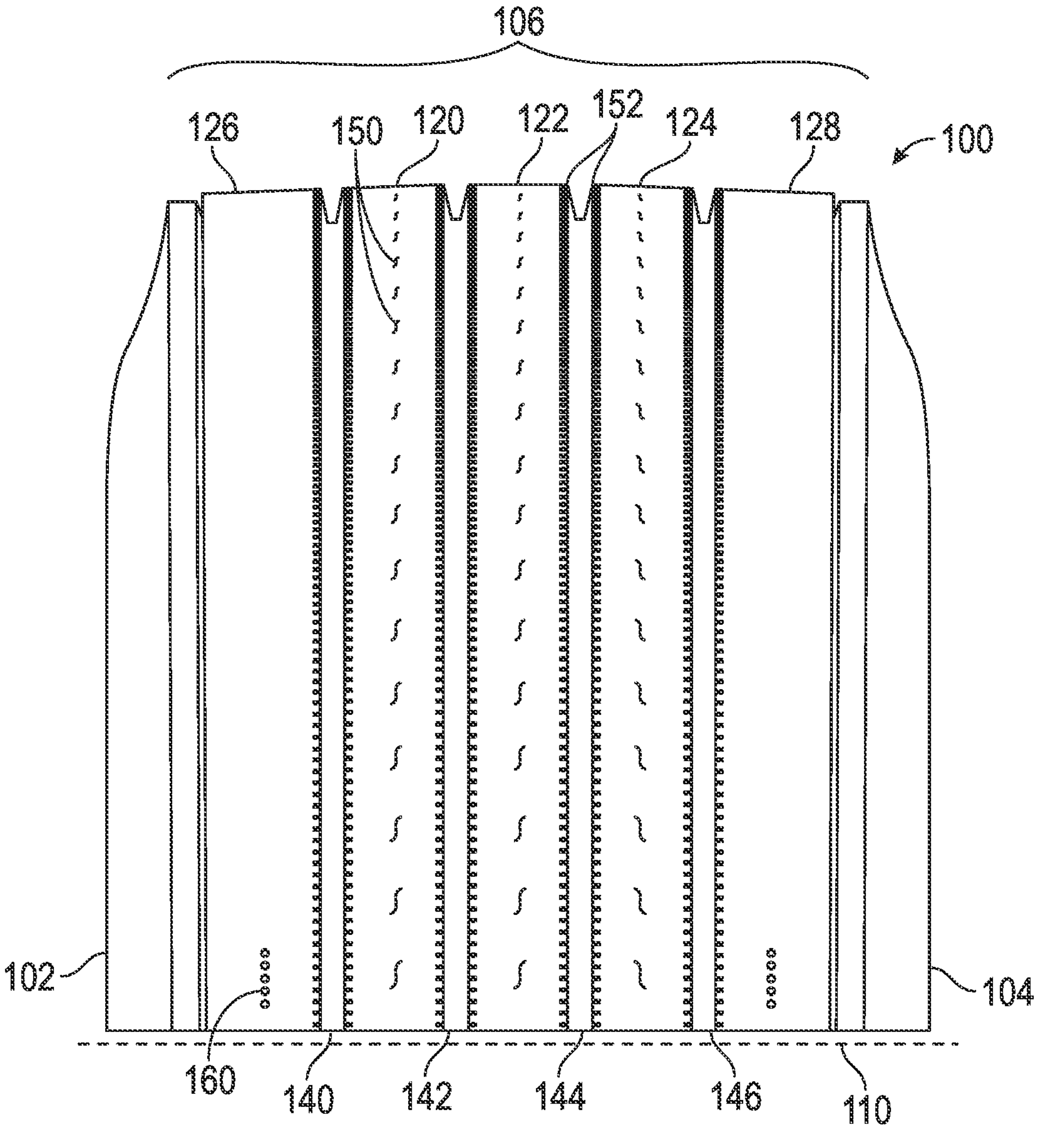
FIG. 1 it is a partial front view of a tire incorporating the new decoupling groove/decoupling rib design.

The following description with reference to the accompanying drawings is provided to assist in a comprehensive understanding of one or more embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the spirit and scope of the present disclosure. Various exemplary embodiments of the present disclosure are not limited to the specific details of different embodiments and should be construed as including all changes and/or equivalents or substitutes included in the ideas and technological scope of the appended claims. In describing the drawings, similar reference numerals are used where possible to refer to similar elements.

The terms “include” or “may include” used in the present disclosure indicate the presence of disclosed corresponding functions, operations, elements, and the like, and do not limit additional one or more functions, operations, elements, and the like. In addition, it should be understood that the terms “include”, “including”, “have” or “having” used in the present disclosure are to indicate the presence of components, features, numbers, steps, operations, elements, parts, or a combination thereof described in the specification, and do not preclude the presence or addition of one or more other features, numbers, steps, operations, elements, parts, or a combination thereof.

The terms “or” or “at least one of A or/and B” used in the present disclosure include any and all combinations of words enumerated with them. For example, “A or B” or “at least one of A or/and B” mean including A, including B, or including both A and B.

Although the terms such as “first” and “second” used in the present disclosure may modify various elements of the different exemplary embodiments, these terms do not limit the corresponding elements. For example, these terms do not limit an order and/or importance of the corresponding elements, nor do these terms preclude additional elements (e.g., second, third, etc.) The terms may be used to distinguish one element from another element. For example, a first mechanical device and a second mechanical device all indicate mechanical devices and may indicate different types of mechanical devices or the same type of mechanical device. For example, a first element may be named a second element without departing from the scope of the various exemplary embodiments of the present disclosure, and similarly, a second element may be named a first element.

It will be understood that, when an element is mentioned as being “connected” or “coupled” to another element, the element may be directly connected or coupled to another element, or there may be an intervening element between the element and another element. To the contrary, it will be understood that, when an element is mentioned as being “directly connected” or “directly coupled” to another element, there is no intervening element between the element and another element.

The terms used in the various exemplary embodiments of the present disclosure are for the purpose of describing specific exemplary embodiments only and are not intended to limit various exemplary embodiments of the present disclosure. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having inconsistent or exaggerated meanings unless they are clearly defined in the various exemplary embodiments.

Turning to FIG. 1, there is shown a partial front view of a tire 100, and one skilled in the art will understand that the design and structure of the illustrated portion of the tire repeats throughout the remaining circumference of the tire. Tire 100 includes a first or outer sidewall 102, a second or inner sidewall 104 spaced from the first sidewall by a ground engaging surface 106 that axially interconnects the first and second sidewalls. The tire 100 rotates about a rotational axis 110. The ground engaging surface 106 includes, for example, one or more circumferentially continuous, central tread portions or ribs 120, 122, 124 and a shoulder region includes shoulder ribs 126, 128 located axially outward of the central ribs. The ribs 120, 122, 124, 126, 128 are axially separated from one another by first, second, third, and fourth circumferentially continuous grooves 140, 142, 144, 146. As shown, the structural details of the grooves 140, 142, 144, 146 may vary, although in the illustrated embodiment, the tire 100 is preferably symmetric about an equatorial plane. The ground engaging surface portions 106 of the central ribs 120, 122, 124 include a series of circumferentially spaced sipes 150, and in addition there are short, narrow grooves 152 on either side of the grooves 140, 142, 144, 146, that intersect the first and second sidewalls of each of the grooves, and terminate within the central ribs 120, 122, 124 and the shoulder ribs 126, 128 at a short axial dimension from the grooves. Still further, the tread surface 106 may include a visual wear indicator 160, although the particular type of wear indicator used on the tire surface may vary. The number of grooves, ribs, and the particular type and design of the sipes, lateral grooves, etc., may vary from one tire style to another.

Figure 2:
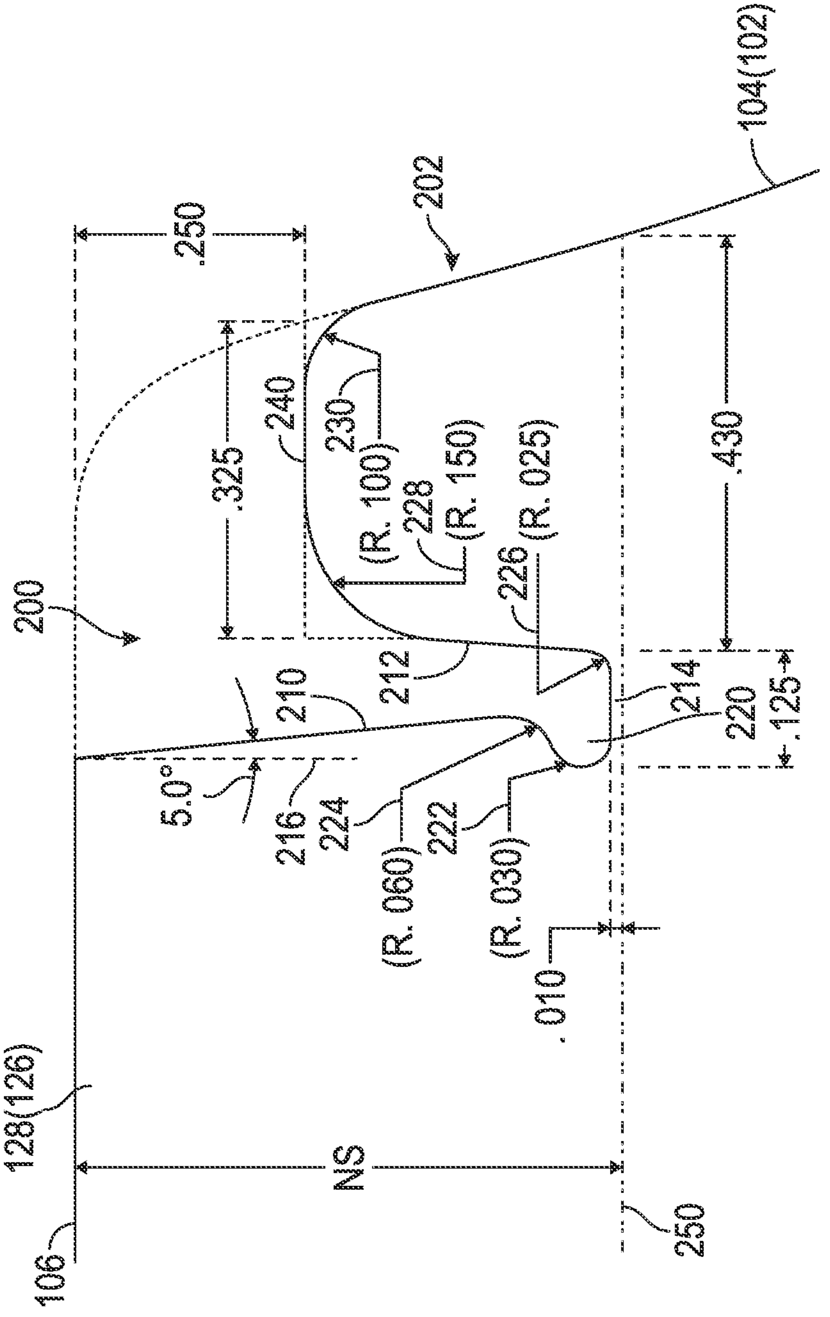
FIG. 2 is an enlarged cross-sectional view of the decoupling groove/decoupling rib design located at axially outward regions from the tread engaging surface and the transition areas into respective tire sidewalls.

With continued reference to FIG. 1, and additional reference to FIG. 2, particular details of a decoupling groove 200 and decoupling shoulder 202 separated from the remainder of the shoulder region, namely shoulder tread rib 126 or 128 are shown. The decoupling groove 200 is spaced axially inward from sidewall 104 (or 102 on the other axial side), and thus forms the decoupling shoulder 202. The decoupling groove 200 includes a first or inner wall 210 and a second or outer wall 212 that are axially spaced from one another and interconnected at inner radial portions by base wall 214. The inner and outer walls 210, 212 of the decoupling groove 200 both angle outwardly as the walls extend radially outward from the base wall 214 toward an outer perimeter of the tire. The width between the walls 210, 212 varies, i.e., increases, as the walls extend radially outward. In particular, the inner wall 210 extends at an angle of the approximately 5° from a radial plane represented by reference numeral 216 that is disposed perpendicular to the rotational axis 110.

The decoupling groove 200 includes an undercut region 220 in the inner wall 210. Specifically, base wall 214 of the decoupling groove 200 has a greater axial dimension (0.125") than a minimum axial spacing between the inner wall 210 and the outer wall 212 above the undercut region 200. Where the greater axial dimension of the base wall 214 interconnects with the inner wall 210 in the undercut region 220, there is provided a first radiused corner 222 (shown as having a radius dimension R of 0.030") and a second radiused corner 224 (radius dimension R of 0.060"). The first radiused corner 222 and the second radiused corner 224 form a reverse curve, smooth interface of the undercut region 220 with the inner wall 210 of the decoupling groove 200. It will be understood that other smooth transition designs between the undercut region 220 and the inner wall 210 are contemplated without departing from the scope and intent of the present disclosure. For example, the first and second curved radiused corners 222, 224 can be interconnected by a linear segment and/or varying arcuate segments in an effort to alleviate stress concentration regions. Additionally, the second radius corner 224 forms a smooth interface of the undercut region 220 with the base wall 214 of the decoupling groove 200. It will be understood that other smooth transition designs between the undercut region 220 and the base wall 214 are contemplated without departing from the scope and intent of the present disclosure. For example, the second radiused corner 224 can be varying arcuate segments and include one or more linear segments in an effort to alleviate stress concentration regions. A third radiused corner 226 (radius dimension R of 0.025") transitions from the base wall 214 to the outer wall 212. A fourth radiused corner 228 (radius dimension R of 0.150") is provided where the decoupling shoulder 202 merges with the outer wall 212 of the decoupling groove 200. Similarly, a fifth radiused corner 230 is provided where the decoupling shoulder 202 merges with the second sidewall 104 (or first sidewall 102). Likewise, other designs that are provided to reduce the stress concentrations in a manner similar to the radiused corners 226, 228, or 230 can be alternately used to achieve these same objectives. Further, a radially outer surface 240 of the decoupling shoulder 202 is spaced radially inward (dimension of 0.250") from the outer radial surface 106 of the adjacent shoulder rib 128. The decoupling shoulder 202 has a generally trapezoidal cross-sectional shape where a smaller axial dimension (0.325") is provided along the outer radial surface 240 while a base portion of the decoupling shoulder has a wider axial dimension (0.430").

As is also evident in FIG. 2, the base wall 214 of the decoupling groove 200 is preferably located above (i.e., radially outward of) the non-skid line 250 of the tire 100. The non-skid line 250 is understood to be the bottom of primary tread grooves and adjacent a transition between a base compound rubber and a rubber compound disposed on top of the base compound rubber that forms the cap or tread ground engaging surface.

The preferred design of the decoupling groove 200 and associated decoupling rib 202 shown and described above reduces stress concentration regions at the bottom of the decoupling groove 200 and allows the top or outer radial portion of the shoulder rib 126/128 to flex. As a result, the normal force imposed on the outside of the shoulder rib 126/128 is reduced and improved irregular wear resistance is achieved. Eliminating stress concentrations reduces chunking of the shoulder, crack initiation, and the potential for tearing of the tread.

Although these preferred apparatus and preferred processes outline a desired configuration or order of individual steps, one skilled in the art will appreciate that still other combinations of the apparatus features or process steps may be included, some omitted, or possibly another order of one or more steps could be provided.

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept or that do not differ from the literal language of the claims, or if they include equivalent structural elements with insubstantial differences from the same concept or from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

Although specific advantages have been enumerated above, various embodiments may include some, none, or all of the enumerated advantages. Although exemplary embodiments are illustrated in the figures and description herein, the principles of the present disclosure may be implemented using any number of techniques, whether currently known or not. Moreover, the operations of the systems and apparatuses disclosed herein may be performed by more, fewer, or other components, and the methods described herein may include more, fewer, or other steps. Additionally, steps may be performed in any suitable order.

To aid the Patent Office and any readers of this application and any resulting patent in interpreting the claims appended hereto, applicants do not intend any of the appended claims or claim elements to invoke 35 USC 112 (f) unless the words "means for" or "step for" are explicitly used in the particular claim.

I claim:

1. A tire comprising:

a first sidewall and a second sidewall joined to each other in axially spaced relation along a rotational axis of the tire by a circumferentially extending ground engaging surface; and a circumferentially extending decoupling groove extending radially inward toward the rotational axis of the tire, the decoupling groove formed by inner and outer walls axially spaced from each other, wherein the inner and outer walls are nonparallel to each other and diverge from each other so that the width between the inner and outer walls increases from a radially inner portion to a radially outer portion of the decoupling groove and the decoupling groove includes an undercut region in the inner wall, a base wall interconnecting inner radial portions of the inner and outer walls, wherein the base wall has a flat portion, and wherein the inner wall extends at an angle of approximately 5 degrees from a radial plane disposed perpendicular to the rotational axis of the tire, and wherein the base wall has a greater axial dimension than a minimum axial spacing between the inner wall and the outer wall above the undercut region, wherein the decoupling groove is located in a shoulder region, and wherein the shoulder region includes a decoupling shoulder and a shoulder rib wherein a portion of the decoupling shoulder is formed by the outer wall of the decoupling groove, and wherein the decoupling shoulder has a radial height less than a radial height of the shoulder rib.

2. The tire of claim 1 wherein the outer wall of the circumferentially extending decoupling groove is angled with respect to the radial direction.

3. The tire of claim 1 wherein the decoupling shoulder includes a radiused, first corner where the decoupling shoulder merges with the outer wall of the decoupling groove.

4. The tire of claim 3 wherein the decoupling shoulder includes a radiused, second corner where the decoupling shoulder merges with the first sidewall.

5. The tire of claim 1 wherein the base wall is located radially outward of a non-skid line of the tire.

6. The tire of claim 1 wherein the decoupling shoulder includes a wider axial dimension along a base portion thereof than a smaller axial dimension along an outer radial surface thereof.

7. The tire of claim 6 wherein the decoupling shoulder includes a radiused, first corner where the decoupling shoulder merges with the outer wall of the decoupling groove, and a radiused, second corner where the decoupling shoulder merges with the first sidewall of the tire.

8. The tire of claim 7 wherein a radial outer surface of the decoupling shoulder is approximately 0.25 inches below the ground engaging surface.

9. The tire of claim 8 wherein the base wall of the decoupling groove is above a non-skid line of the tire.

10. The tire of claim 9 wherein transition regions between (i) the inner wall of the decoupling groove and the undercut region, and (ii) the outer wall of the decoupling groove and the undercut region are radiused.

11. The tire of claim 10 wherein an extension region where the greater axial dimension of the base wall interconnects with the minimum axial spacing between the inner wall and the outer wall above the undercut region includes first and second radiused connecting portions.

12. The tire of claim 1 wherein the flat portion of the base wall extends in the axial direction.

13. The tire of claim 1 wherein the outer wall has a linear portion.

* * * * *